United States Patent [19]
Lang, Jr.

[11] Patent Number: 5,110,081
[45] Date of Patent: May 5, 1992

[54] VIBRATION-ISOLATING MOUNT

[76] Inventor: William O. Lang, Jr., 19149 Manila Ave., Bloomington, Calif. 92316

[21] Appl. No.: 588,760

[22] Filed: Sep. 26, 1990

[51] Int. Cl.5 ............................................... F16F 3/08
[52] U.S. Cl. ..................................... 248/635; 267/293
[58] Field of Search ................. 248/635, 634; 267/293, 267/141, 153

[56] References Cited
U.S. PATENT DOCUMENTS 4,286,777  9/1981  Brown ............................. 248/635 X
4,884,656  12/1989  Baleti et al. ...................... 248/634 X Primary Examiner—Alvin C. Chin-Shue
Attorney, Agent, or Firm—Christie, Parker & Hale

[57] ABSTRACT

A vibration-isolating mount for heavy machinery, such as bus engines, large electrical motors, and similar rotating machinery, comprising a first soft urethane body having fan annular shoulder which rests on the surface of the vehicle frame and a cylindrical neck which has an axial length that extends into a hole in the frame. The mount also has a second soft urethane body having an annular shoulder which rests on the opposite surface of the frame and a cylindrical neck which has an axial length that extends into the hole from the opposite surface of the frame. The axial length of the neck of the first body is substantially less than the axial length of the neck of the second body with a total length of the first neck and the second neck being equal to the axial length of the hole in the frame. The mount additionally has a hard urethane sleeve for adding rigidity to the first and second bodies. The first body and the second body have aligned axial bores for receiving the hard urethane sleeve, and the hard urethane sleeve has an axial bore for receiving a bolt to secure the mount to the frame.

10 Claims, 3 Drawing Sheets

VIBRATION-ISOLATING MOUNT

BACKGROUND OF THE INVENTION

The attenuation and damping of vibration and noise created by the operation of heavy machinery, such as bus engines, large electrical motors, compressors, and similar rotating machinery, are problems needing a long lasting solution. This is especially true in the commercial transportation industry because of the large amounts of money spent each year on the maintenance of buses to replace the relatively short lived engine mounts which are currently used to suppress transmission of vibration and noise.

The conventional method of damping vibration and reducing noise created by the operation of an engine is with a T-shaped rubber mount called a motor mount, and which is positioned between the engine and the vehicle frame. A metal cylindrical sleeve runs vertically the height of the motor mount to provide structural rigidity to the mount. A metal bolt passes through the metal sleeve for securing the mount to the frame.

A number of problems have become apparent with the use of a conventional rubber motor mount which makes its use less desirable. Due to the many moving parts associated with an operating engine, a large amount of vibration is created which is transmitted through the mount to the frame which, in turn, is felt by the passengers in the vehicle. The rubber outside portion of the mount serves to dampen some of the vibration, but because of the metal sleeve incorporated in the mount, a substantial amount of the vibration is transmitted through the sleeve. This defeats the purpose of the mount, which, of course, is to dampen the vibration.

A second problem associated with the use of a conventional mount is that because the sleeve is made of metal, there is a metal-to-metal interface between the mount and either the frame or the engine which produces an excessive amount of noise due to the vibration of the engine while it is operating. This is an especially important problem for the transportation industry to eliminate because of their desire to provide a quiet and comfortable ride for passengers.

Another noise problem is created by the conventional mount design because the bolt, which passes through the metal sleeve and secures the mount to the frame, has a tendency to stretch over a period of time due to the vibration of the running engine and therefore causes the bolt to be loose and rattle in the sleeve. Because the sleeve is metal, it is being compressed and it is unable to maintain a snug relationship between the bolt and the sleeve.

A third problem is that the conventional engine mount has a relatively short service life. Because of the shear and torquing forces applied by the motor to the motor mount, the rubber has a tendency to collapse in a relatively short time. Rubber also has a tendency to deteriorate when it comes in contact with gasoline, oil, grease, road salt, or other chemicals and solvents present in an engine environment. As a result of this relatively short service life, a substantial amount of money is spent in replacing the mounts. Not only are maintenance costs high, but there is also a substantial amount of downtime for the vehicle.

Still another problem associated with the conventional motor mount is an identification problem. In a typical bus configuration there can be as many as 11 mounts used in connection with securing the engine and the transmission to the frame, and the mounts to be used are not all the same size. Because the mounts are made of rubber it is difficult to place a permanent identifying mark on it. The usual way to identify which mount is to be used in a particular place is by a color coding scheme. The mounts are painted a particular color to indicate where they are to be used; however, rubber is not an ideal surface for painting and many times the paint does not adhere to the rubber which leads to improper installation. Accordingly, a need exists for an improved motor mount with vibration damping and noise-reducing characteristics, and which has a long service life, is easily identifiable, and significantly reduces maintenance time and costs.

SUMMARY OF THE INVENTION

This invention is directed to an improved vibration-isolating mount. The mount is composed entirely of polyurethane elastomers wherein a relatively soft urethane (with a hardness in the range of 40 to 95 Durometer A) is substituted for the rubber used in conventional mounts and a relatively hard (in the range of 40 to 80 Durometer D) urethane is substituted for the metal sleeve of a conventional mount. In the preferred embodiment, the mount comprises three pieces, wherein the soft urethane outer body is an I-shaped two-piece configuration. The first or upper body is composed of a shoulder and a downwardly extending relatively short neck. The second or bottom piece is composed of a shoulder and an upwardly extending substantially longer neck. Both the upper body and the lower body have a cylindrical axial bore running through for receiving the third piece which is a cylindrical hard urethane sleeve. The hard urethane sleeve has a corresponding cylindrical bore running through for receiving a bolt. The mount also could be inverted, that is, the short neck extending upwardly and the long neck extending downwardly in accordance with the demands of a particular application.

In use, the engine is slightly lifted above the frame allowing the upper body to be slid in between the engine and the frame until the short neck fits in concentric fashion with an opening in the frame so the shoulder rests on the surface of the frame. The lower body is then placed in the same opening in the frame from the bottom with the long neck extending up into the frame, until it meets the short neck of the upper body, and the shoulder meets the bottom surface of the frame. The hard urethane sleeve, which is for adding rigidity to the soft urethane bodies, is then slid into the bore in the lower body from the bottom and pushed upward until it passes through the bore in the upper body. All three pieces are then held in place by use of a bolt which is slid into the cylindrical bore in the hard urethane body.

DETAILED DESCRIPTION

Figure 1:
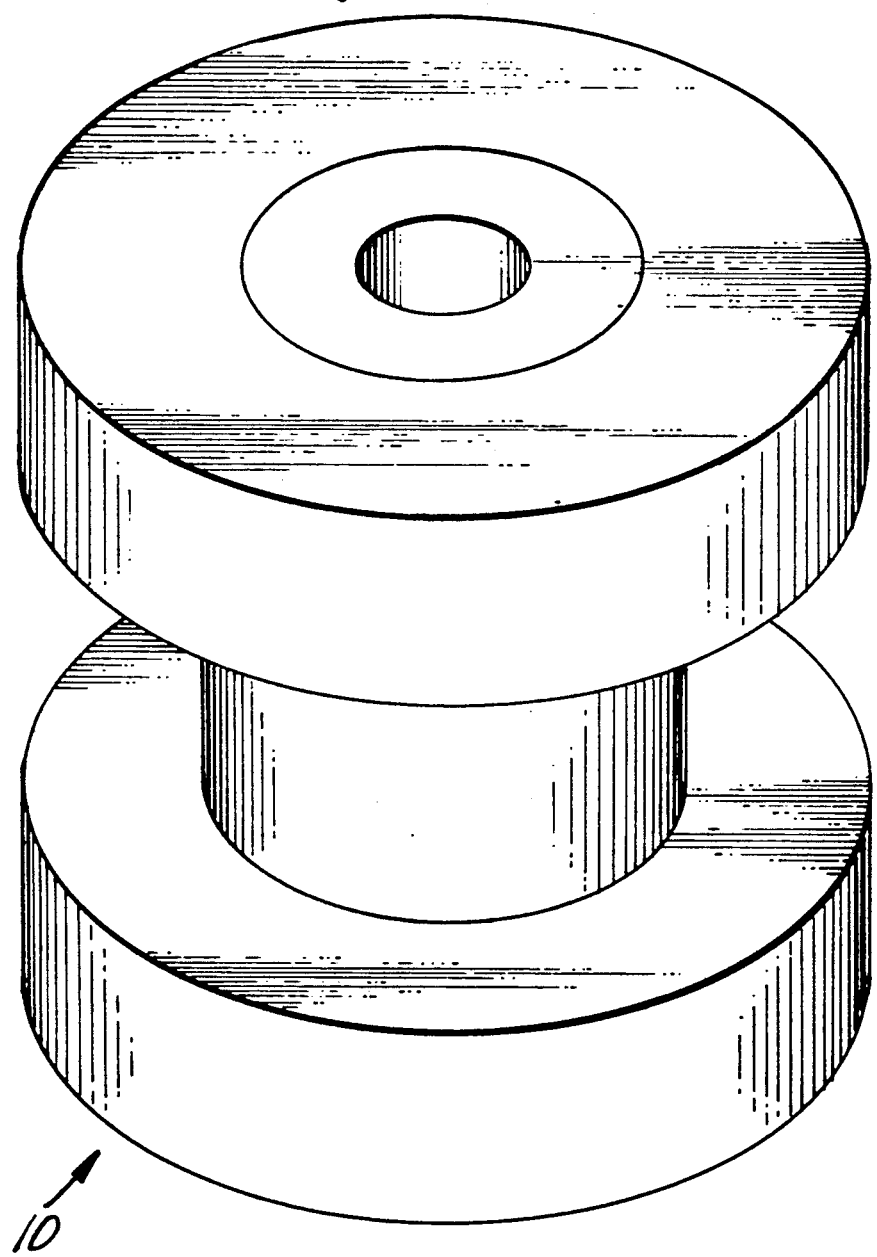
FIG. 1 is a perspective view of a three-piece vibration-isolating mount in accordance with the principles of this invention.
Figure 2:
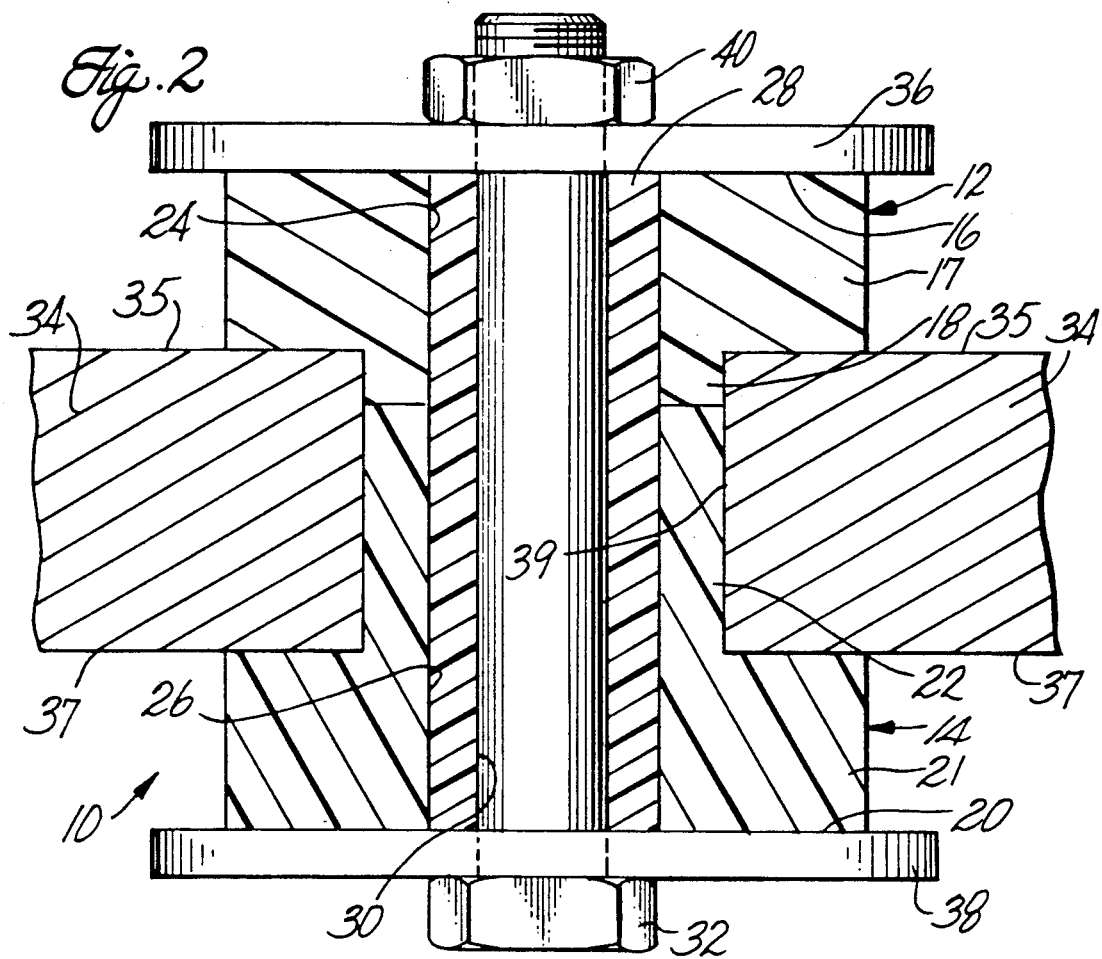
FIG. 2 is a cross-sectional side elevation of the mount of FIG. 1.

Referring to the drawings, FIGS. 1 and 2 illustrate a generally cylindrical vibration-isolating mount 10 constructed in accordance with the principles of this invention. Vibration-isolating mount 10 comprises an upper soft urethane body 12 and a lower soft urethane body 14. The upper body has an upper portion 16 with an undersurface defining a radially extending shoulder 17, and from which extends a downwardly projecting neck 18. The lower body has a lower portion 20 with a surface defining a radially extending shoulder 21, and from which extends an upwardly projecting neck 22. The upper body neck has an axial length that is substantially less than the axial length of the lower body neck.

Both the upper body and the lower body are preferably made from a liquid urethane elastomer marketed under the trademark ADIPRENE L-100, or ADIPRENE L-83. The important characteristic of the upper and lower bodies is that the urethane has a hardness in the range of 40 to 95 Durometer A, the exact hardness corresponding to the user's specifications. Cylindrical axial bores 24 and 26 extend through each the upper and the lower bodies, respectively, in order to receive a hard cylindrical urethane sleeve 28 which makes an interference fit within the resilient bodies.

The hard urethane sleeve is made from a liquid urethane elastomer commonly known by the trademark ADIPRENE L-325. The significant characteristic of the hard urethane sleeve is that it has a hardness in the range of 40 to 80 Durometer D. Ideally, the hard urethane sleeve replaces the conventional metal sleeve, however, a conventional metal sleeve can be utilized with the soft urethane bodies, if necessary by the requirements of a particular user. The hard urethane sleeve also has a cylindrical axial bore 30 extending therethrough to receive a bolt 32 which is used for installing the vibration-isolating mount.

The vibration-isolating mount is designed for easy installation when there is a relatively small amount of clearance space available between the motor (not shown) and frame 34. The motor is raised above the frame a relatively short distance slightly greater than the axial length of the upper body to allow the upper body to be slipped between the motor and the frame until neck 18 is directly over a hole 39 in the frame. The neck is lowered into the hole until shoulder 17 rests upon frame surface 35.

Once the upper body is in place, the lower body can be installed by placing neck 22 into the same hole in the frame from underneath and pushing the lower body upward until shoulder 21 meets bottom surface 37 of the frame and the lower body neck meets the upper body neck.

The hard urethane sleeve is fitted into bore 26 in the lower body from the bottom of the frame until it is fully inserted within bore 24 of the upper body. A washer 36 is then placed on upper portion 16 of the upper body and another washer 38 is placed upon lower portion 20 of the lower body. Bolt 32 is then placed through cylindrical axial bore 30 in the hard urethane sleeve and is tightened by the use of a nut 40. A conventional lock washer (not shown) or other securing device can be used to anchor the nut against unwanted rotation.

Figure 3:
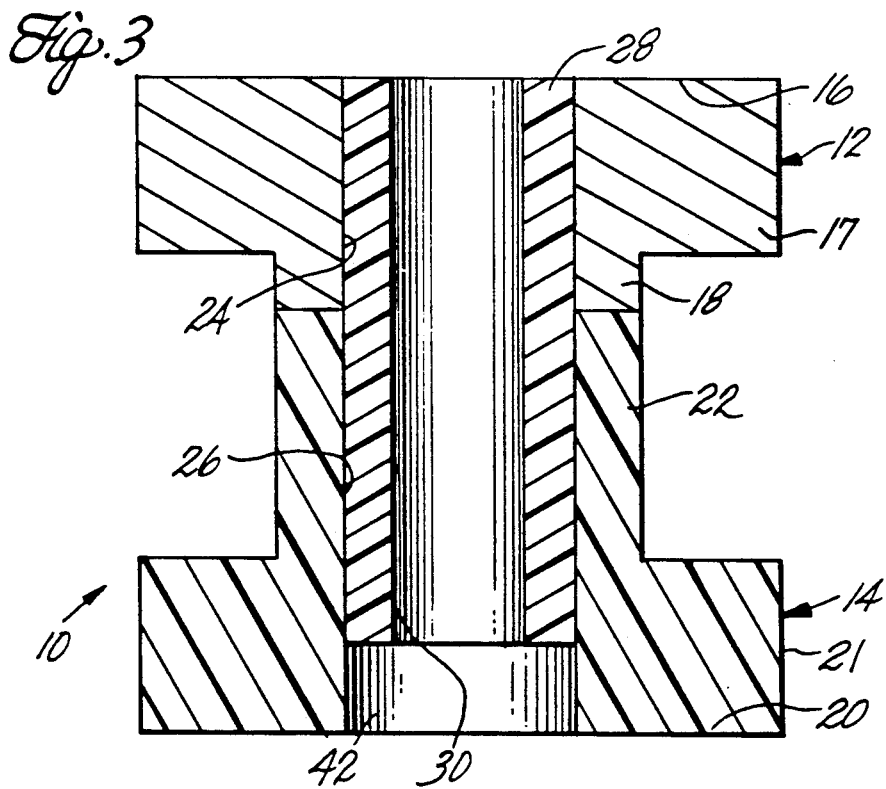
FIG. 3 is a cross-sectional side elevation of an alternative embodiment of the mount of FIG. 2.

Referring now to FIG. 3, a vibration-isolating mount 10 is illustrated which is similar to the vibration-isolating mount of FIG. 2, but with the additional feature of a recess 42. The recess is incorporated into the design for instances where the bolt head or the nut must be flush with the surface of the upper or lower body. The recess is accomplished by simply shortening hard urethane sleeve 28 an amount equal to the height of a bolt head or a nut.

Figure 4:
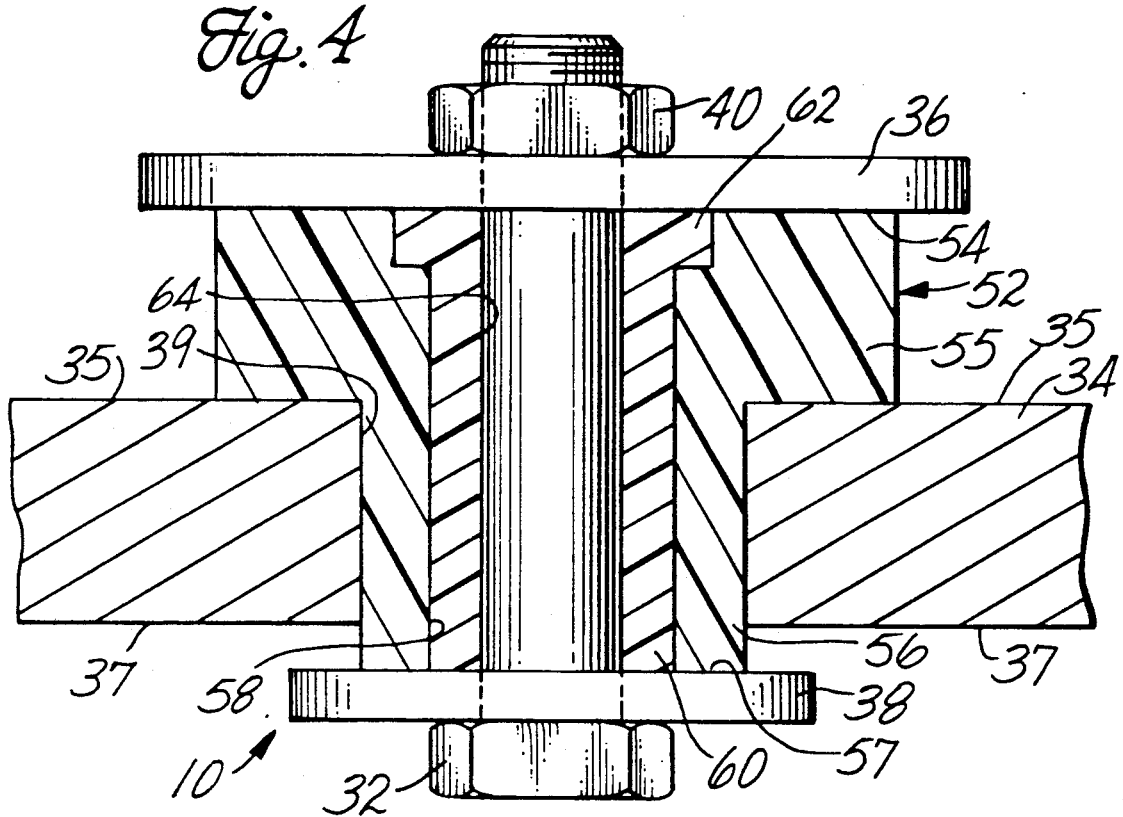
FIG. 4 is a cross-sectional elevation of a two-piece vibration-isolating mount in accordance with the principles of this invention.
Figure 5:
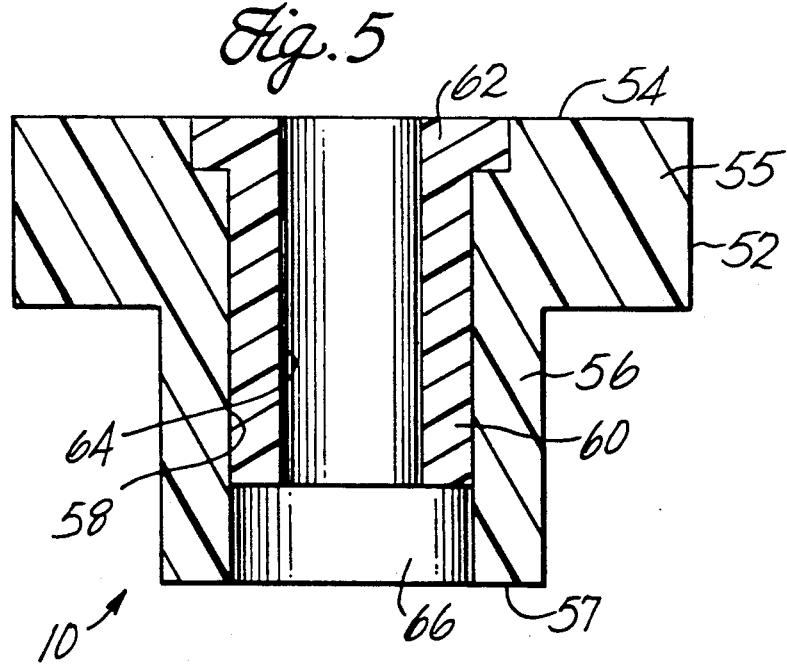
FIG. 5 is a cross-sectional elevation of an alternative embodiment of the mount of FIG. 4.

FIGS. 4 and 5 illustrate a second alternative embodiment of a vibration-isolating mount in accordance with the principles of the invention. The vibration-isolating mount 10 is used in an application where the amount of clearance space between an engine and the frame is not a concern. The vibration-isolating mount comprises a soft urethane body 52 and a cylindrical hard urethane sleeve 60. Body 52 has an upper portion 54 with an undersurface defining a radially extending shoulder 55, and from which extends a downwardly projecting neck 56. A cylindrical axial bore 58 extends through the body in order to receive a hard urethane sleeve 60 which makes an interference fit within the resilient body. In this instance, the sleeve has a flange 62 around its upper surface for added structural integrity. A cylindrical axial bore 62 also extends through the hard urethane sleeve in order to receive a bolt 32 which is used in installing the mount. The urethane used for the soft urethane body and the hard urethane sleeve is exactly the same as the urethane used in the vibration-isolating mount of FIG. 2.

In installing the vibration-isolating mount, neck 56 is placed in an opening 39 in frame 34 and is pushed downwardly into the frame until shoulder 55 rest upon frame surface 35, with the bottom portion of the neck protruding beyond bottom surface 37 of the frame. The hard urethane sleeve is then fitted into the bore of the body and pushed downwardly until the flange rests in the shoulder of the body. Washers 36 and 38 are placed at the top and bottom surfaces 54 and 57, respectively, of the soft urethane body and bolt 32 is placed into the bore in the hard urethane sleeve and tightened down by the use of a nut 40. A conventional lock washer (not shown) or other securing device can be used to anchor the nut against unwanted rotation. As the bolt is tightened, the bottom portion of the neck has a tendency to flex outwardly thus preventing the vibration-isolating mount from sliding out of the frame.

FIG. 5 illustrates a vibration-isolating mount 10 similar to the mount in FIG. 4 with the additional feature of a recess 66. The recess provides the same feature as in FIG. 3 where the bolt head or the nut must be in a flush relationship with the surface level of the mount. Again, this is accomplished by simply shortening the length of the hard urethane sleeve a corresponding amount equal to the height of a bolt head or a nut.

The substitution of urethane for the metal sleeve greatly reduces the vibration that was formerly transmitted through the sleeve to the frame of the vehicle. Urethane is shock-absorbing and creates a damping effect upon the vibration that is created by the running engine. Noise reduction is also achieved by the elimination of the metal-to-metal surface by substituting urethane for the metal sleeve. Because of the elastomeric properties of urethane, the problem associated with noise created by bolt stretching is also eliminated. When the bolt is initially tightened down, the urethane body is slightly compressed and as the bolt stretches the compression is relieved and the urethane sleeve restores to its original configuration thus maintaining the sleeve and the bolt in a snug relation.

The service life of a vibration-isolating mount is dramatically enhanced by the substitution of urethane for rubber. Urethane has high tensile strength and resilience, and has an excellent resistance to abrasion, compression set, gasoline, oils, grease, or other chemicals and solvents present in an engine environment. Therefore, the problems of collapsing and deterioration of the rubber have been eliminated. With the enhanced service life, a corresponding reduction in replacement costs and maintenance time will be achieved.

Maintenance time has also been reduced by designing the neck portion, of the preferred embodiment, of the upper body to be relatively short. This allows for installation of the mount when there is normally little clearance space. The design only requires the motor to be slightly lifted above the frame. Previously, because little clearance space, it was necessary to remove the entire engine from the frame in order to install a conventional motor mount.

The problem associated with installing a motor mount in the wrong location has also been eliminated by the use of a color coding scheme. Urethane can be colored prior to molding the mount which is not just a painted on surface but is present through the entire part. Therefore, the vibration-isolating mounts are molded in different colors to correspond with different locations for installation according to the requirements of a particular user.

What is claimed is:

1. A vibration-isolating mount comprising:
   a first soft urethane body having an annular shoulder which rests on one surface of a frame and a cylindrical neck which has an axial length that extends into a hole in the frame;
   a second soft urethane body having an annular shoulder which rests on an opposite surface of the frame and a cylindrical neck which has an axial length that extends into the same hole from the opposite surface of the frame;
   the first soft urethane body and the second soft urethane body having a urethane hardness in the range of about 40 to about 95 Durometer A;
   the axial length of the neck of the first body being substantially less than the axial length of the neck of the second body with the total length of the first neck and the second neck being equal to the axial length of the hole in the frame;
   a cylindrical sleeve for adding rigidity to the first body and the second body;
   the first body and the second body having aligned axial bores for receiving the cylindrical sleeve; and
   the cylindrical sleeve having an axial bore for receiving a bolt for securing the mount to the frame.

2. A vibration-isolating mount as recited in claim 1 wherein the cylindrical sleeve is urethane which is substantially harder than the first body and the second body.

3. A vibration-isolating mount as recited in claim 2 wherein the urethane of the sleeve has a hardness in the range of about 40 to about 80 Durometer D.

4. A vibration-isolating mount as recited in claim 1 wherein the cylindrical sleeve is metal.

5. A vibration-isolating mount as recited in claim 1 wherein the cylindrical sleeve extends the entire axial height of the first soft urethane body and the second body.

6. A vibration-isolating mount as recited in claim 1 wherein the cylindrical sleeve extends the entire axial height of the first body but not the entire axial height of the second body.

7. A motor vibration damping system comprising:
   a motor;
   a vehicle frame;
   a bolt; and
   a vibration-isolating mount placed in between the motor and the frame comprising:
   a first soft urethane body having an annular shoulder which rests on one surface of a frame and a cylindrical neck which has an axial length that extends into a hole of the frame;
   a second soft urethane body having an annular shoulder which rests on an opposite surface of the frame and a cylindrical neck which has an axial length that extends into the same hole from the opposite surface of the frame;
   the first soft urethane body and the second soft urethane body having a urethane hardness in the range of about 40 to about 95 Durometer A;
   the axial length of the neck of the first body is substantially less than the axial length of the neck of the second body with the total length of the first neck and the second neck being equal to the axial length of the hole in the frame;
   a cylindrical sleeve for adding rigidity to the first body and the second body;
   the first body and the second body having an axial bore for receiving the cylindrical sleeve; and
   the cylindrical sleeve having an axial hole for receiving a bolt for securing the mount to the frame.

8. A motor vibration damping system as recited in claim 7 wherein the cylindrical sleeve is urethane which is substantially harder than the first body and the second body.

9. A motor vibration damping system as recited in claim 7 wherein the urethane of the cylindrical sleeve has a hardness in the range of about 40 to about 80 Durometer D.

10. A motor vibration damping system as recited in claim 7 wherein the cylindrical sleeve is metal.

* * * * *